US008693472B2

(12) United States Patent
Jiang

(10) Patent No.: US 8,693,472 B2
(45) Date of Patent: Apr. 8, 2014

(54) BUFFER PROCESSING METHOD, A STORE AND FORWARD METHOD AND APPARATUS OF HYBRID SERVICE TRAFFIC

(75) Inventor: Fan Jiang, Shenzhen (CN)

(73) Assignee: ZTE Corporation (CN)

( * ) Notice: Subject to any disclaimer, the term of this patent is extended or adjusted under 35 U.S.C. 154(b) by 187 days.

(21) Appl. No.: 13/059,783

(22) PCT Filed: Aug. 13, 2009

(86) PCT No.: PCT/CN2009/073235
§ 371 (c)(1),
(2), (4) Date: Feb. 18, 2011

(87) PCT Pub. No.: WO2010/020156
PCT Pub. Date: Feb. 25, 2010

(65) Prior Publication Data
US 2011/0149991 A1    Jun. 23, 2011

(30) Foreign Application Priority Data
Aug. 19, 2008    (CN) .......................... 2008 1 0142472

(51) Int. Cl.
H04L 12/66    (2006.01)
(52) U.S. Cl.
USPC ............ 370/389; 370/312; 370/473; 370/474
(58) Field of Classification Search
USPC ................ 370/389, 473, 474, 352–356, 349, 370/310.2, 328, 338, 312, 392; 711/216, 711/136
See application file for complete search history.

(56) References Cited

U.S. PATENT DOCUMENTS

| 6,335,938 | B1 * | 1/2002 | Chiang et al. ............... 370/458 |
| 6,625,146 | B1 * | 9/2003 | Merchant et al. ............ 370/389 |
| 6,816,488 | B1 * | 11/2004 | Merchant et al. ............ 370/389 |
| 7,016,352 | B1 * | 3/2006 | Chow et al. ................. 370/392 |
| 7,027,414 | B2 * | 4/2006 | Walsh et al. ................. 370/316 |
| 7,042,842 | B2 * | 5/2006 | Paul et al. .................... 370/229 |
| 7,126,913 | B1 * | 10/2006 | Patel et al. ................. 370/230.1 |
| 7,139,271 | B1 | 11/2006 | Parruck et al. |
| 7,177,276 | B1 * | 2/2007 | Epps et al. ................... 370/230 |
| 7,369,550 | B1 * | 5/2008 | Chiang ........................ 370/389 |
| 7,440,405 | B2 * | 10/2008 | Hsieh et al. .................. 370/235 |

(Continued)

FOREIGN PATENT DOCUMENTS

CN    1826768 A    8/2006
CN    1859275 A    11/2006
CN    1913486 A    2/2007

Primary Examiner — Robert Wilson
Assistant Examiner — Sai Aung
(74) Attorney, Agent, or Firm — Brooks Kushman P.C.

(57) ABSTRACT

The present invention provides a cache processing method, a storing and forwarding method and apparatus of hybrid service flows. The cache processing method comprises: configuring at least one port cache area for each input port receiving the hybrid service flows, and configuring at least one type cache area for each service type of the hybrid service flows; storing control information of each data packet into the port cache area of the corresponding port according to a source port of the data packet; and indentifying the service type of the data packet from the control information of the data packet, and storing the acquired control information of the data packet into the type cache area of the corresponding service type according to the service type of the data packet. The present invention allows each type of data packets from each port to have an independent processing procedure.

10 Claims, 3 Drawing Sheets

(56) References Cited

U.S. PATENT DOCUMENTS

| | | |
|---|---|---|
| 7,724,754 B2 * | 5/2010 | Kapoor et al. ............... 370/412 |
| 7,873,048 B1 * | 1/2011 | Kondapalli ................... 370/392 |
| 8,255,530 B1 * | 8/2012 | Chen et al. ................... 709/224 |
| 2003/0014483 A1 * | 1/2003 | Stevenson et al. ........... 709/203 |
| 2005/0047338 A1 | 3/2005 | Hoffman et al. |
| 2005/0141503 A1 * | 6/2005 | Welfeld ........................ 370/392 |
| 2006/0002386 A1 | 1/2006 | Yik et al. |
| 2006/0039374 A1 * | 2/2006 | Belz et al. .................... 370/389 |
| 2006/0203721 A1 * | 9/2006 | Hsieh et al. .................. 370/229 |
| 2007/0195761 A1 * | 8/2007 | Tatar et al. ................... 370/389 |
| 2010/0023726 A1 * | 1/2010 | Aviles .......................... 711/216 |
| 2010/0146213 A1 * | 6/2010 | Yao et al. ..................... 711/136 |

\* cited by examiner

BUFFER PROCESSING METHOD, A STORE AND FORWARD METHOD AND APPARATUS OF HYBRID SERVICE TRAFFIC

CROSS-REFERENCE TO RELATED APPLICATION

This application is the U.S. national phase of PCT Appln. No. PCT/CN2009/073235 filed Aug. 13, 2009 which claims priority to Chinese Application Nos. 200810142472.5 filed Aug. 19, 2008, the disclosures of which are incorporated in their entirety by reference herein.

TECHNICAL FIELD

The present invention relates to the field of Ethernet data service processing, and more particularly, to a cache processing method, a storing and forwarding method and apparatus of hybrid service flows.

BACKGROUND ART

The data processing of multi-port input hybrid service flows is a relatively complicated and cumbersome task. At present, in processing the multi-port input hybrid service flows, the same processing method as that in processing a single service flow is used, that is, the input data flows perform the cache applying and storing of data in an order by which they are input, and the enqueued data packets are assigned to corresponding queues and wait for scheduling applications to be output. Each queue has a different output attribute and is scheduled based on the attribute according to a certain scheduling strategy. Therefore, the data packets are read out from a cache area and output in an appointed or standard format so as to complete storing and forwarding of the data packets.

Such design is competent for traditional and simple service flows. However, with the rapid development of data services, this design is already out at the elbows, because it neither meets performance requirement of hybrid service processing nor facilitates processing and monitoring of a certain service. Meanwhile, because of enormous types of hybrid service flows, the number of service input ports tend to increase as well, thus, such method for caching data according to the input order in the prior art causes the increasing of test complexity of data packets of the hybrid service flows and the test becomes more difficult.

SUMMARY OF THE INVENTION

In view of the above-described background, the present invention provides a cache processing method, a storing and forwarding method and apparatus of hybrid service flows so as to simplify design complexity and decrease test difficulty in processing the hybrid service flows.

In order to solve the above technical problem, the present invention uses the following technical scheme.

The present invention provides a cache processing method of hybrid service flows comprising at least one data packet, and the cache processing method comprises the following steps:

A1: configuring at least one port cache area for each input port receiving the hybrid service flows, and configuring at least one type cache area for each service type of the hybrid service flows;

A2: storing control information of the data packet into the port cache area corresponding to the input port of the data packet; and A3: acquiring the control information of the data packet from the port cache area, indentifying the service type of the data packet from the acquired control information of the data packet, and storing the acquired control information of the data packet into the type cache area corresponding to the service type of the data packet.

Further, in the method, two port cache areas are configured for each input port receiving the hybrid service flows respectively, and the control information of the data packet comprises data packet description information and data packet storage description information, which are respectively stored into the two port cache areas corresponding to the input port of the data packet.

Further, between the step A2 and step A3, the method also comprises determining whether the data packet is a data packet to be discarded based on the control information of the data packet, and if yes, the data packet is discarded.

The present invention also discloses a storing and forwarding method of hybrid service flows comprising at least one data packet, and the storing and forwarding method comprises cache processing of the data packet and scheduling and outputting of the data packet, wherein the cache processing of the data packet comprises:

B1, configuring at least one port cache area for each input port receiving the hybrid service flows, and configuring at least one type cache area for each service type of the hybrid service flows;

B2, storing control information of the data packet into the port cache area corresponding to the input port of the data packet; and B3, acquiring the control information of the data packet from the port cache area, indentifying the service type of the data packet from the acquired control information of the data packet, and storing the acquired control information of the data packet into the type cache area corresponding to the service type of the data packet.

Further, the scheduling and outputting of the data packet comprises:

C1, extracting the control information of the data packet from the type cache area, acquiring the data packet based on the control information of the data packet and mapping the acquired data packet to each queue; and C2, scheduling and outputting data packets in each queue according to a predetermined arbitrating and scheduling strategy.

Further, in the method, the predetermined arbitrating and scheduling strategy is round-robin (RR) scheduling.

Further, in the method, two port cache areas are configured for each input port receiving the hybrid service flows respectively, and the control information of the data packet comprises data packet description information and data packet storage description information, which are respectively stored into the two port cache areas corresponding to the input port of the data packet.

Further, between the step B2 and step B3, the method also comprises determining whether the data packet is a data packet to be discarded based on the control information of the data packet, and if yes, the data packet is discarded.

The present invention also discloses a storing and forwarding apparatus of hybrid service flows comprising at least one data packet, and the storing and forwarding apparatus comprises a data packet control information caching module, an enqueuing preprocessing module and an enqueuing mapping module.

The data packet control information caching module is configured to configure at least one port cache area for each input port receiving the hybrid service flows and store control information of the data packet into the port cache area corresponding to the input port of the data packet.

The enqueuing preprocessing module is configured to acquire the control information of the data packet from the port cache area, indentifying the service type of the data packet from the acquired control information of the data packet, and store the acquired control information of the data packet into a type cache area corresponding to the service type of the data packet.

The enqueuing mapping module is configured to acquire the control information of the data packets from the type cache area, map the data packet to each queue in a predetermined way, and schedule and output data packets in each queue.

Further, the apparatus also comprises an enqueuing counting module configured to count the numbers of different service types of discarded and received data packets.

In the present invention, according to different input ports of input service flows and different service types, the data packets of the hybrid service flows are cached into corresponding cache areas using a port+type manner and wait for corresponding processing procedures in turn such that each type of data packets from each port can have an independent processing procedure. Thus, control flows of different types of data packets can be processed in parallel, thereby improving the overall performance and facilitating the controlling of proportion of overall bandwidth occupied by different types of data packets, while achieving good expansibility.

PREFERRED EMBODIMENTS OF THE INVENTION

The present invention will be further described in detail with reference to the accompanying figures and in conjunction with specific embodiments.

In order to process hybrid service flows comprising a plurality of data packets, headers of the input data packets are required to be analyzed such that the data packets are sorted to obtain unicast flows, multicast flows, broadcast flows, flood flows or other types of data flows. Traffic policing for each type of data flows is required to be performed, and the data packets can be enqueued only when the traffic policing requirement is met.

Information of a data packet is mainly divided into two portions: one being a control flow that mainly comprises control information of the data packet; the other being a data flow that mainly is referred to as content of the data packet. The control information of the data packet is involved mainly in the present invention.

Figure 1:
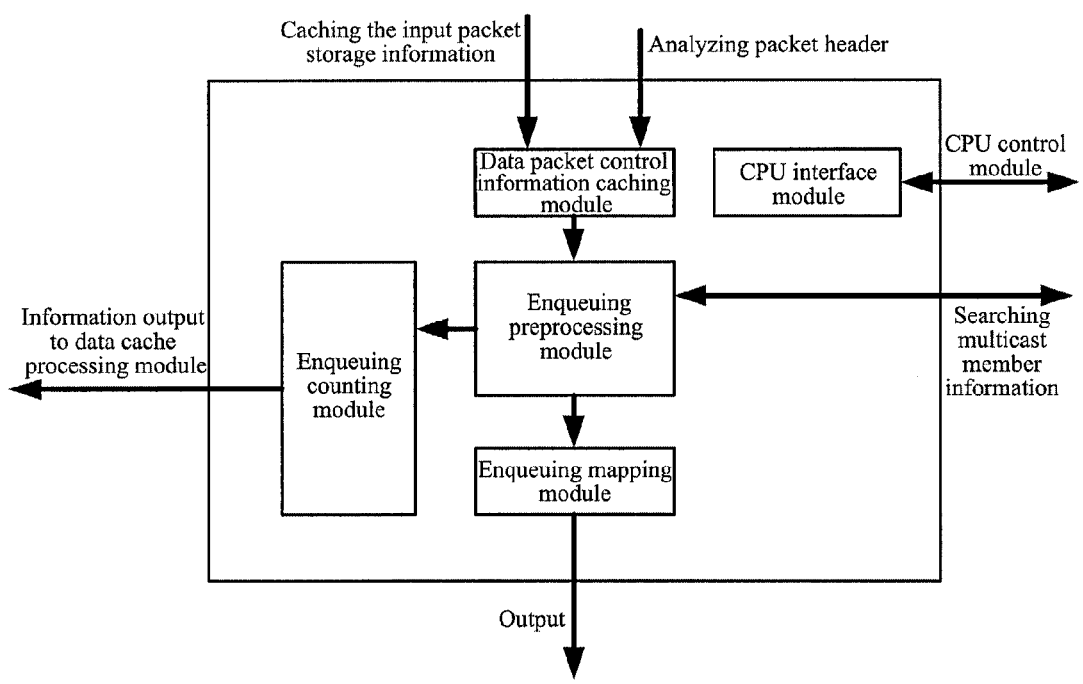
FIG. 1 is a block diagram of a principle of a storing and forwarding apparatus in accordance with an embodiment of the present invention.

As shown in FIG. 1, a storing and forwarding apparatus in accordance with an embodiment of the present invention mainly comprises an input data packet control information caching module, a CPU interface module, an enqueuing preprocessing module, an enqueuing mapping module and an enqueuing counting module. Control information of a data packet consists of data packet description information and data packet storage description information. Here, control flow information of the data packets is called as the control information as a whole, information related to an attribute and a service type of the data packet in the control information is called as the data packet description information, and information related to storage of the data packet in the control information is called as the data packet storage description information. On the one hand, a header of the data packet is analyzed to acquire the related description information, such as the service type and attribute of the data packet, as an input to the input data packet control information caching module; on the other hand, the content of the data packet is required to be correspondingly cached and managed to acquire the related storage description information of the data packet as another input to the data packet control information caching module. The data packet control information caching module manages at least one port cache area and caches the control information of the data packet into the corresponding port cache area according to a source port of the data packet. One port may correspond to one port cache area, and preferably, one port may correspond to two port cache areas, one being used to cache the data packet description information in the control information, and the other being used to cache the data packet storage description information in the control information.

The CPU interface module mainly receives the control information and configuration data from the CPU control module. The main configuration data comprises the service type of the data packet, such as a member lookup table of multicast, broadcast or flood data packets, a queue mapping mode and a queue mapping table, as well as a counting result read from the enqueuing counting module.

Figure 2:
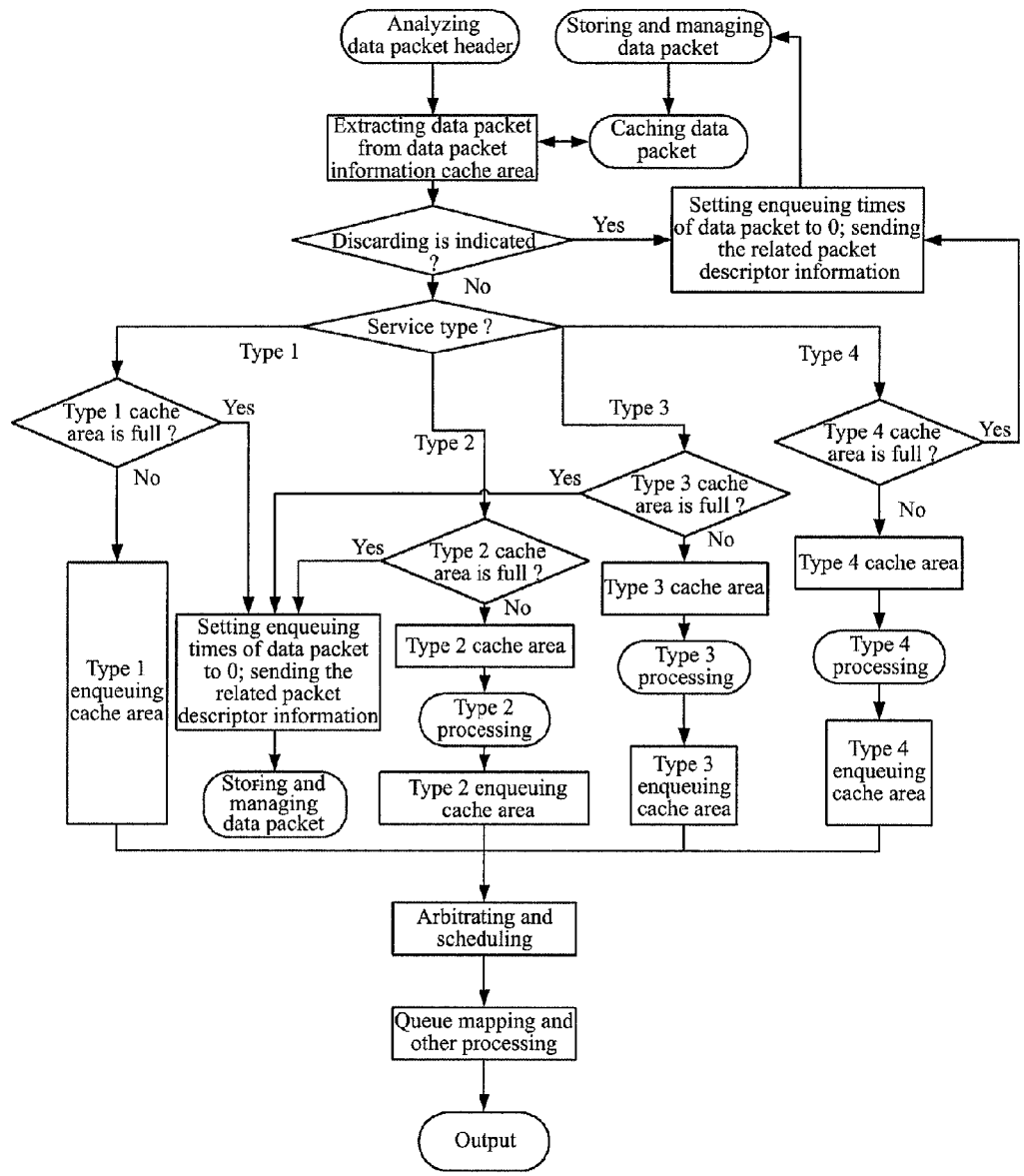
FIG. 2 is a flow chart of a storing and forwarding method in accordance with an embodiment of the present invention.

The enqueuing preprocessing module is a key processing portion in the apparatus in accordance with the present invention. It manages at least one type cache area and is configured to cache the control information of the data packet of the corresponding service type. Functions implemented by the enqueuing preprocessing module mainly include identifying the service type of the data packet and storing it into the corresponding service type cache area. Meanwhile, a certain arbitrating and scheduling strategy is used for all members waiting for enqueuing in different service type cache areas (the control information of each data packet), so as to select a member in a certain service type cache area to send to the enqueuing mapping module for enqueuing mapping processing. Referring to FIG. 2, a processing procedure of the enqueuing preprocessing module is shown and will be described hereinafter.

A main function of the enqueuing mapping module is to map all data packets in different service type enqueuing cache areas to the corresponding queues according to a certain queue mapping principle (e.g., a queue number of a data packet may be obtained by combining 802.1P, an input port number and an output port number of the data packet), so as to store and manage the data packets in the same queue using a queue method; meanwhile, all data flow services are scheduled from their respective queues in an order by which they are input. The queue mapping method may be used to obtain a corresponding queue ID by searching the configuration table in CPU interface module described above. It should be understood that by the processing of a data packet is meant that the data in the data packet itself, that is, the content of the data packet, is stored in an external cache space after the data packet arrives, and then the content of the whole data packet can be located, as long as starting and ending positions of the data packet in the external cache space are recorded. In the subsequent processing procedure, what is managed and transported is just description information of the data packet and position information of data packet in the cache space (that is, the above-mentioned storage description information), and when the data packet is required to be sent out, only the content of the whole data packet is required to be extracted based on the stored position information and is modified pertinently based on the description information of the data packet to obtain the data finally sent. Therefore, the data packet entering into the input data packet control information caching module is herein referred to as the control information of the data packet (the data packet description information+storage description information) rather than the content of the data packet.

The enqueuing counting module is configured to count the numbers of different service types of discarded and received data packets; moreover, the discarded data packets are required to identify different discarding types. Additionally, the enqueuing counting module also counts the number of the discarded data packets generated in the enqueuing preprocessing module. The role of the enqueuing counting module is to strengthen the monitoring of different service types of data packets and improve the testability of the module under the hybrid service flows.

FIG. 2 illustrates a flow chart of a storing and forwarding method in accordance with an embodiment of the present invention, and its main process will be described below.

After a data packet of hybrid service flows is stored and managed, storage description information of the data packet is sent to a data packet control information caching module, and after a header of the data packet is analyzed, description information of the data packet is obtained and sent to the data packet control information caching module as well.

After the data packet is cached, the control information of the data packet is read from a cache area corresponding to the control information of the data packet based on the carried port information. If the data packet is a data packet to be discarded, a data packet data flow control portion is notified, the enqueuing times of the data packet is set to 0, the data packet is indicated as a data packet to be discarded, and information related to the data packet is sent back such that the data packet data flow control portion can recycle a data storage space occupied by the discarded data packet according to discarding indication information and the released data storage space can be reassigned and reused. The main function of the data flow control portion is to assign and recycle the storage space, as described previously, that is, the content of the data packet is required to be stored in the external cache space, and the position information in the external cache space is recorded; after the content of the data packet is read out, the storage space occupied by the data packet is required to be released so as to be reassigned later to store the content of a new data packet. Structurally, the data flow control portion and the apparatus in accordance with the present invention are two adjacent independent units.

If the data packet is not a data packet to be discarded, then the type of the data packet is identified after the control information of the data packet is received. The data packet is written into a corresponding service type cache area according to the service type of the data packet. Each service type cache area is only used for temporary storage, the control information of the data packet of the corresponding service type is processed and then stored into a next level data packet enqueuing cache area corresponding to its type. It should be noted that in FIG. 2, a type 1 branch under the service type decision box directly enters into a type 1 enqueuing cache area after a type 1 cache area is determined to be full, which is slightly different from the descriptions of type 2, 3, and 4 branches, in order to embody different processing procedures for different types of service flows.

When the data packet is written to the type cache area, if the type cache area is full, the data packet is discarded directly. The operation of discarding the data packet when the type cache area is full is the same as the discarding operation when the data packet is a data packet to be discarded.

When there is control information in enqueuing cache areas of different service types, information is required to be extracted from the enqueuing cache areas to process queue mapping and other functions. Thus, the enqueuing cache areas of different service types are required to be arbitrated and scheduled. Considering the efficiency of arbitrating and scheduling, it is necessary that there is activation information in each enqueuing cache area, and if there is no activation information, the currently scheduled enqueuing cache area is skipped directly and the next enqueuing cache area is entered for scheduling.

Unlike the multicast packets, broadcast packets or flood packets which involve a plurality of data forwarding destination addresses, when a unicast data packet enters into a unicast enqueuing cache area, the control information of the data packet is required to be written into the enqueuing cache area. After the queue mapping and other functions are implemented, the unicast data packet stored in the unicast enqueuing cache area is outputted in an appointed standard packet descriptor format according to a certain scheduling strategy.

The common data service types include unicast, multicast, broadcast and flood services. The present invention will be further described in detail with reference with FIG. 3 by taking the four common service flows input from four ports as examples.

Figure 3:
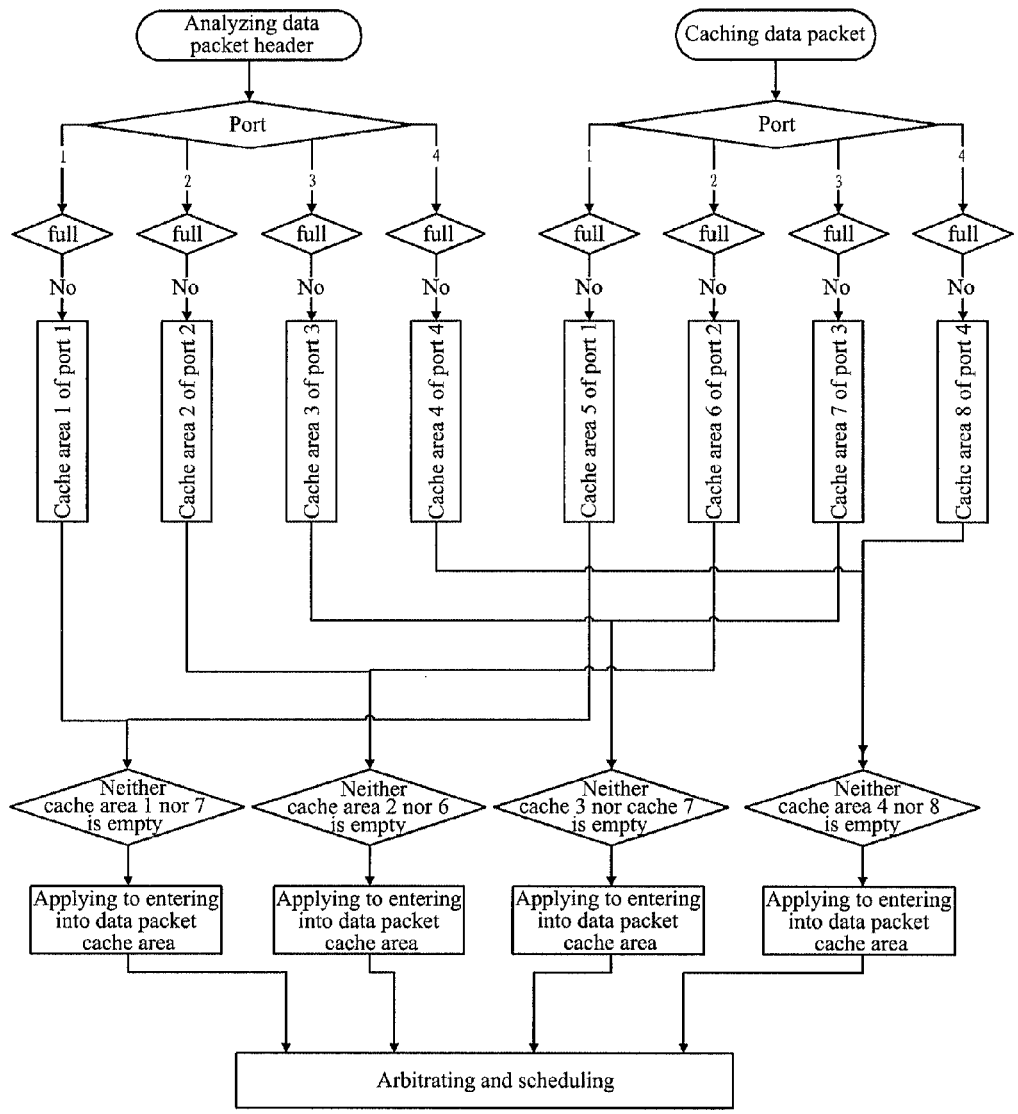
FIG. 3 is a flow chart of a cache processing method in accordance with an embodiment of the present invention.

As shown in FIG. 3, for data flows come from four ports, headers of the data packets are analyzed to obtain and store the related data packet description information, such as the types of the data packets and the attributes of the data packets, into different port cache areas according to different ports, for example, the data packet description information from port 1 is stored in cache area 1 of port 1, the data packet description information from port 2 is stored in cache area 2 of port 2, the data packet description information from port 3 is stored in cache area 3 of port 3, and the data packet description information from port 4 is stored in cache area 4 of port 4.

On the other hand, for the data flows from the four ports, i.e., contents of the data packets are required to cached and managed correspondingly to acquire data packet storage description information regarding to the storage of the data packets, for example, the data packet storage description information from port 1 is stored in cache area 5 of port 1, the data packet storage description information from port 2 is stored in cache area 6 of port 2, the data packet storage description information from port 3 is stored in cache area 7 of port 3, and the data packet storage description information from port 4 is stored in cache area 8 of port 4.

Here, cache areas 1 to 8 are implemented in the form of first-in-first-out (FIFO), and the depth of each FIFO is 16. The information of the data packets can not be discarded in all of the cache areas, and the data packet description information, such as the packet type and packet attribute, obtained by operations of the data packet header data analyzing portion must be stored in cache areas 1 to 4 of the corresponding ports. Likewise, the data packet storage description information acquired by operations of the data packet cache processing portion must be stored in cache areas 5 to 8 of the corresponding ports.

The control information of the data packets from port 1 can be combined only when neither cache area 1 nor cache area 5 corresponding to input port 1 is empty, and it is sent to the type cache area of the corresponding type according to the type of the data packet. Otherwise, the control information of the data packets cannot be combined if one of cache areas 1 and 5 corresponding to input port 1 is empty. The principle of combining the control information of the data packets from ports 1, 2, 3 and 4 is the same as that of combining the control information of the data packets from port 1.

After the control information of the data packets enters into the corresponding type cache areas, the data packets are arbitrated and scheduled. Although there are a variety of arbitrating and scheduling strategies, the simplest and most common RR scheduling method is used herein. The RR scheduling method is well known to those skilled in the art and will not be repeated any more herein.

Taking a multicast packet as an example, when a multicast enqueuing cache area is not full, a multicast packet to be processed is extracted from a multicast type cache area, the first pointer of a member in a multicast group is extracted from control information of the multicast packet, and information to be modified or replaced of all members in the multicast group is obtained by searching a multicast member table with the extracted first pointer of the multicast group.

New control information of the data packets is obtained by combining configuration information of the multicast member table with the input control information (i.e., the original control information+the configuration information of the members=the new control information of the members). Packet descriptor information after the multicast member is copied is written into the multicast enqueuing cache area. Whenever one multicast member is copied, all members in the multicast group are required to be checked to determine whether the coping is completed, and if the coping of the members has not yet completed, the coping continues; otherwise, the previous operation is repeated (i.e., the multicast packets are re-extracted from the type cache area to start a new coping process until all members are copied).

The copying of the current multicast member is stopped when the multicast member enqueuing cache area is full, while the copying procedure continues when the multicast member enqueueing cache area is not full. The principles of copying and processing of the broadcast packet, the flood packet and the multicast packet are the same.

For the arbitrating and scheduling of the enqueuing cache areas, the corresponding arbitrating and scheduling strategies may be selected flexibly according to different types of data packets and the corresponding bandwidth requirements.

Although the above example is an operational example of 4 ports, it is not meant that only data flows from the four ports can be processed, input data flows from any number of ports can be processed. Likewise, although only the unicast packets, multicast packets, broadcast packets and the flood packets are listed hereinabove, it is not meant that only the four types of packet data flows can be processed, other types of data packets can be processed as well.

The present invention discloses a cache processing method, a storing and forwarding method and apparatus of hybrid service flows so as to process different types of data flows in parallel such that the processing performance of data flows is improved and the proportion of the overall bandwidth occupied by different types of data flows can be assigned. The design procedure is simple and clear, meanwhile, real-time situations of different data flows during service processing can be checked conveniently by configuring the enqueuing counting module, thereby improving the testability and greatly decreasing the test difficulty. Thus, the problems that there are different types of data flows and requirements for the proportion of the overall bandwidth occupied by different types of data flows are different may be better solved.

Meanwhile, the present invention exhibits good expandability. With the continuous development of the communication industry, data flow services to be processed are more and more abundant such that in the case where the bandwidth is higher and higher, the present invention can be expanded conveniently to more input service flow ports and designs of more service types, and different scheduling strategies can be used flexibly according to different types of services and bandwidth requirements.

The above content is a further detailed illustration of the present invention described in conjunction with the specific preferred embodiment, and the specific implementation of the present invention is not limited thereto. It is apparent to a person of ordinary skill in the art that a number of simple modifications or substitutions which belong to the protection scope of the present invention can be made to the present invention without departing from the spirit and essence of the present invention.

INDUSTRIAL APPLICABILITY

The present invention may process different types of data flows in parallel such that the processing performance of data flows is improved and the proportion of the overall bandwidth occupied by different types of data flows can be assigned. Thus, the problems that there are different types of data flows and requirements for the proportion of the overall bandwidth occupied by different types of data flows are different may be better solved. Meanwhile, the present invention exhibits good expandability. In addition, the present invention can be expanded conveniently to more input service flow ports and designs of more service types, and different scheduling strategies can be used flexibly according to different types of services and bandwidth requirements.

I claim:

1. A cache processing method of hybrid service flows of a data packet, the cache processing method comprising the following steps:
    A1: configuring at least one port cache area for each input port receiving the hybrid service flows, and configuring at least one type cache area for each service type of the hybrid service flows;
    A2: storing a content of the data packet in an external cache space after the data packet arrives at the input port, storing control information of the data packet into the port cache area corresponding to the input port of the data packet, wherein the control information comprises data packet description information and data packet storage description information, and wherein the data packet storage description information comprises position information of the content of the data packet in the external cache space; and
    A3: acquiring the control information of the data packet from the port cache area, identifying the service type of the data packet from the acquired control information of the data packet, and storing the acquired control information of the data packet into the type cache area corresponding to the service type of the data packet.

2. The method according to claim 1, wherein
    two port cache areas are configured for each input port receiving the hybrid service flows respectively, the data packet description information and the data packet storage description information are respectively stored into the two port cache areas corresponding to the input port of the data packet.

3. The method according to claim 2, wherein between the step A2 and step A3, the method further comprises determining whether the data packet is a data packet to be discarded based on the control information of the data packet, and if yes, the data packet is discarded.

4. A storing and forwarding method of hybrid service flows of a data packet, and the storing and forwarding method comprising cache processing of the data packet and scheduling and outputting of the data packet, wherein the cache processing of the data packet comprises:

B1, configuring at least one port cache area for each input port receiving the hybrid service flows, and configuring at least one type cache area for each service type of the hybrid service flows;

B2, storing a content of the data packet in an external cache space after the data packet arrives at the input port, storing control information of the data packet into the port cache area corresponding to the input port of the data packet, wherein the control information comprises data packet description information and data packet storage description information, and wherein the data packet storage description information comprises position information of the content of the data packet in the external cache space; and B3, acquiring the control information of the data packet from the port cache area, indentifying the service type of the data packet from the acquired control information of the data packet, and storing the acquired control information of the data packet into the type cache area corresponding to the service type of the data packet.

5. The method according to claim 4, wherein the scheduling and outputting of the data packet comprises:

C1, extracting the control information of the data packet from the type cache area, acquiring the data packet based on the control information of the data packet and mapping the acquired data packet to each queue; and C2, scheduling and outputting data packets in each queue according to a predetermined arbitrating and scheduling strategy.

6. The method according to claim 5, wherein the predetermined arbitrating and scheduling strategy is round-robin (RR) scheduling.

7. The method according to claim 4, wherein two port cache areas are configured for each input port receiving the hybrid service flows respectively, and the data packet description information and data packet storage description information are respectively stored into the two port cache areas corresponding to the input port of the data packet.

8. The method according to claim 7, wherein between the step B2 and step B3, the method further comprises determining whether the data packet is a data packet to be discarded based on the control information of the data packet, and if yes, the data packet is discarded.

9. A storing and forwarding apparatus of hybrid service flows of a data packet, the storing and forwarding apparatus comprising at least one processor for executing a data packet control information caching module, an enqueuing preprocessing module and an enqueuing mapping module, wherein the data packet control information caching module is configured to configure at least one port cache area for each input port receiving the hybrid service flows and store control information of the data packet into the port cache area corresponding to the input port of the data packet;

the enqueuing preprocessing module is configured to store a content of the data packet in an external cache space after the data packet arrives at the input port, acquire the control information of the data packet from the port cache area, identify the service type of the data packet from the acquired control information of the data packet, and store the acquired control information of the data packet into a type cache area corresponding to the service type of the data packet, wherein the control information of the data packet comprises data packet description information and data packet storage description information, and wherein the data packet storage description information comprises position information of the content of the data packet in the external cache space; and the enqueuing mapping module is configured to acquire the control information of the data packets from the type cache area, map the data packet to each queue in a predetermined way, and schedule and output data packets in each queue.

10. The apparatus according to claim 9, wherein the at least one processor is further configured to execute an enqueuing counting module configured to count the numbers of different service types of discarded and received data packets.

* * * * *